United States Patent
Wilson

(10) Patent No.: US 7,248,631 B2
(45) Date of Patent: *Jul. 24, 2007

(54) METHOD FOR REDUCING PROCESSING POWER REQUIREMENTS OF A VIDEO DECODER

(75) Inventor: William Brent Wilson, British Columbia (CA)

(73) Assignee: Matsushita Electric Industrial Co., Ltd., Osaka (JP)

( * ) Notice: Subject to any disclaimer, the term of this patent is extended or adjusted under 35 U.S.C. 154(b) by 22 days.

This patent is subject to a terminal disclaimer.

(21) Appl. No.: 10/060,236

(22) Filed: Feb. 1, 2002

(65) Prior Publication Data

US 2002/0080874 A1    Jun. 27, 2002

Related U.S. Application Data

(63) Continuation of application No. 09/168,852, filed on Oct. 9, 1998, now Pat. No. 6,389,071.

(30) Foreign Application Priority Data

Oct. 16, 1997    (JP)    ................... 9-283640

(51) Int. Cl.
*H04B 1/66* (2006.01)

(52) U.S. Cl. ................ 375/240.01; 375/240.25; 375/240.26; 375/240.29; 375/240.15; 375/240.16; 382/233; 382/235; 382/238; 382/236

(58) Field of Classification Search ........... 375/240.01, 375/240.02, 240, 240.25, 240.26, 240.29, 375/240.15, 240.16; 348/405, 416, 384, 348/403–404, 406–407, 426; 382/233, 251, 382/235, 238, 236

See application file for complete search history.

(56) References Cited

U.S. PATENT DOCUMENTS 4,633,462 A * 12/1986 Stifle et al. ................. 370/448

(Continued)

FOREIGN PATENT DOCUMENTS

EP    95/4348    2/1995

(Continued)

OTHER PUBLICATIONS

ISO/IEC JTC 1/SC29 Coding of Audio, Picture, Multimedia and Hypermedia information (Jun. 8, 1994).

(Continued)

*Primary Examiner*—Shawn S. An
(74) *Attorney, Agent, or Firm*—Greenblum & Bernstein, P.L.C.

(57) ABSTRACT

A system and method dynamically process video data received by a video decoder by determining a throttling amount, at a decoder throttling device, based on a measure of computational processing power required to decode at least one bitstream of the video data or the decoder's processing capabilities. The computational processing requirements of the decoder are controlled based on the throttling amount, including reducing the processing performed on the decoded video data prior to displaying a picture associated with the decoded video data. The decoder may reduce the amount of processing by limiting functions of at least one post filter or conversion filter. The computational processing requirements may also be controlled by comparing temporal references of two motion vectors of a picture of the video data, determining which motion vector has a closer temporal distance from the picture being decoded and processing only the motion vector having the closer temporal distance.

20 Claims, 3 Drawing Sheets

U.S. PATENT DOCUMENTS

| | | |
|---|---|---|
| 5,325,124 A | 6/1994 | Keith |
| 5,386,241 A * | 1/1995 | Park .................... 375/240.02 |
| 5,440,345 A | 8/1995 | Shimoda |
| 5,596,369 A | 1/1997 | Chau |
| 5,635,985 A * | 6/1997 | Boyce et al. .......... 375/240.15 |
| 5,680,482 A * | 10/1997 | Liu et al. .................... 382/233 |
| 5,703,697 A | 12/1997 | Normile |
| 5,760,794 A | 6/1998 | Munson et al. |
| 5,802,211 A | 9/1998 | King |
| 5,812,788 A * | 9/1998 | Agarwal .................... 348/405 |
| 5,818,532 A * | 10/1998 | Malladi et al. ............ 348/405 |
| 5,822,005 A | 10/1998 | Horne |
| 5,825,674 A | 10/1998 | Jackson |
| 5,889,561 A | 3/1999 | Kwok et al. |
| 5,903,313 A * | 5/1999 | Tucker et al. ................ 348/416 |
| 6,243,421 B1 | 6/2001 | Nakajima et al. |
| 6,353,633 B1 * | 3/2002 | Her ........................ 375/240.18 |
| 6,389,071 B1 * | 5/2002 | Wilson ........................ 375/240 |

FOREIGN PATENT DOCUMENTS

| | | |
|---|---|---|
| EP | 0711079 | 5/1996 |
| EP | 0721286 | 7/1996 |
| EP | 0790579 | 8/1997 |
| EP | 0794675 | 9/1997 |
| EP | 0817501 | 1/1998 |

OTHER PUBLICATIONS

ISO/IEC 13818-2 Information technology-Generic coding of moving pictures and associated audio information: Video (1st ed. May 15, 1996); Reference No. ISO/IEC 13818-2: 1996(E).

ISO/IEC 11172-2:1993(E) Coding of Moving Pictures and Associated Audio for a Digital Storage Media at up to about 1.5Mbit/s: Part II of video.

ISO/IEC 2-11172 rev (Jun. 12, 1991).

An article by Osako et al., entitled "A Dynamic Computation Resource Scalable Algorithm for Software Video CODEC," pp. 515-518, which published Sep. 10, 1997.

* cited by examiner

METHOD FOR REDUCING PROCESSING POWER REQUIREMENTS OF A VIDEO DECODER

CROSS-REFERENCE TO RELATED APPLICATIONS

This application is a Continuation of U.S. application Ser. No. 09/168,852, filed Oct. 9, 1998 now U.S. Pat. 6,389,071, the contents of which are herein incorporated by reference in its entirety.

BACKGROUND OF THE INVENTION

1. Field of the Invention

The present invention relates to a method for reducing processing power requirements of a video decoder, and more particularly, to a digital video decoders and the reduction of computational requirements of these decoders.

2. Description of the Related Art

Digital video has become widespread in the field of consumer electronics, due in large part to the emergence of digital video standards such as MPEG1 (see "CD11172—Coding of Moving Pictures and Associated Audio for Digital Storage Media at up to about 1.5 Mbps" by International Organisation for Standardisation, ISO MPEG Document, ISO-IEC/JTC1/SC2/WG11, 1994), MPEG2 (see "IS13818—Generic coding of Moving Pictures and Associated Audio" by International Organisation for Standardisation, ISO MPEG Document, ISO-IEC/JTC1/SC2/WG11, 1994), and the emerging standard MPEG4, which includes further added functionality and quality over MPEG1 and MPEG2. In MPEG1 and MPEG2 decoders, there are certain expectations regarding the decoder computational power which must be met in order to conform to the respective standard. For example, in the MPEG2 standard, Main Profile and Main Level (MP@ML) describes a set of bounds on the bitstream and associated video which all conformant MP@ML decoders must adhere to.

There are many situations where a decoder lacks sufficient computational power to decode a bitstream as it was intended. One example is on the internet where typically MPEG1 video bitstreams can be found and decoded using computers varying from high end scientific work stations to simple personal computers. When computational power is limited, one way the decoder can reduce it's computational requirements is to simply slow down the decoder output picture rate enough to permit all decoding to be accomplished. This was a very common method used by software based MPEG1 video decoders running on personal computers. Another method is to periodically skip the decoding of some pictures. For example, bi-directionally predicted pictures (B-pictures) can be skipped, effectively reducing the decoder output picture rate by picture-dropping. MPEG4 includes the concept of video objects, which are picture sequences which may be used to describe a separable object in a scene. If a scene contains many objects, the least important objects can be dropped in favor of giving the necessary computational power to the decoding of the more important objects.

There is a growing abundance of digital video bitstreams available, and a growing number of computational requirements associated with each. Due to the wide range of platforms that can be used for video decoding, there is a need for decoders which can decode bitstreams without requiring the full computational power required to meet conformance criteria. Existing techniques such as picture display rate reduction, picture dropping or object dropping techniques reduce the computational power at the expense of decoded video picture quality and synchronisation. For example, changing the picture display rate and picture dropping can have an effect on the perceived synchronisation of audio and video, commonly referred to as lip-synch. It also has the effect of making scenes with motion appear jerky.

An object of this invention is to permit video decoders to reduce the computational requirements of decoding a bitstream without affecting the picture rate. This will permit lip-synch to be maintained while compromising visual quality. It will also permit scenes which become jerky using picture dropping techniques to appear more smooth. Similarly, it will permit more objects to be present in the scene, since the computational power can be allocated to more objects, at the expense of object quality.

SUMMARY OF THE INVENTION

An object of this invention is to permit video decoders which lack the computational power to decode a bitstream to conformance, to decode a bitstream with varying degrees of visual quality degradation. This will permit a wide variety of decoders to be made, each with varying cost/performance trade-offs. An expensive decoder with a very high computational power can be used to decode bitstreams with a much better resulting quality than an inexpensive decoder with low computational power. By using this invention, the same bitstream may be decoded by a wide range of computational power decoders, to result in varying degrees of acceptable visual quality.

An object of this invention is to reduce the cost of video decoders. By designing video decoders that are able to meet constraints such as those imposed by MPEG2 MP@ML limitations, excessive computational power overhead must be built into the decoder to guarantee real time picture decoding of worst-case (high complexity) bitstreams. In other words, the pictures are decoded on time even when the worst case bitstream is decoded. However, by using this invention, decoders can be made which gracefully degrade picture quality when their performance limitations are met.

For the purpose of solving the above described problems, the method of reducing processing power requirements of a video decoder described herein was invented. Said processing power requirements may be controlled based on a throttling amount. Said throttling amount may be based on one or more measures of the processing power required to decode one or more bitstreams, one or more measures of said decoder's processing capabilities, or some combination of these measures.

The measures of the processing power required to decode a bitstream may comprise of an indication of the syntax elements in said bitstream, an indication of the type of processing required for said bitstream, an indication of the amount of processing required for said bitstream, or some combination of these indications.

Reduction of processing power requirements is accomplished by reducing the processing power used for one or more decoder functions by limiting said decoder function in some way.

The limiting may comprise turning off the use of one or more of the motion vectors normally used to retrieve a motion compensated reference. This may be done by selecting from a choice of motion vectors which normally are used to retrieve a pixel regions motion compensated reference predictor region, one or more motion vectors whose use is turned off.

Selection of said motion vectors may comprise of selecting the motion vectors which are of temporally longest distance, selecting the motion vectors which are least highly correlated with those motion vectors in surrounding regions of the picture region being decoded, selecting the motion vectors which are of spatially longest distance, selecting all motion vectors, or any combination of these and other selection criteria.

Another method for limiting said decoder function comprises of modifying motion vectors, possibly by limiting the precision and/or range of one or more of the decoder's motion vectors.

Another method for limiting said decoder function comprises of reducing the number of coefficients inverse quantized and inverse DCT transformed by selectively setting coefficients to alternate values, such as zero.

Another method for limiting said decoder function comprises of reducing the amount of decoder processing used for decoding the color components of the video bitstream.

Another method for limiting said decoder function comprises of reducing the amount of processing performed on the decoder's output video pictures.

The throttling amount serves to control which and by how much to limit said decoder functions in some way. It is possible to determine the processing power requirements from one or more bitstreams, as well as the existing processing power capabilities of the decoder, and use this information to make a decision about which and how much to throttle, or limit said decoder functions during the decoding of said bitstreams By limiting the decoder functionality, the processing power can be reduced.

The identification of which functions to limit and in what way can be made using indications such as the syntax elements in said bitstream, and the type and amount of processing required for said bitstream. Said limiting may comprise turning off the use of one or more of the motion vectors normally used to retrieve a motion compensated reference, based on a decision made with reference to indications in the bitstream about what motion vectors exist, or some other indications from the bitstream or decoder.

The choice of what motion vectors in a picture to turn off can be further refined by selecting the motion vectors which are of temporally longest distance, selecting the motion vectors which are least highly correlated with those motion vectors in surrounding regions of the picture region being decoded, selecting the motion vectors which are of spatially longest distance, selecting all motion vectors, or any combination of these and other selection criteria.

Similarily, said limiting may comprise of limiting the precision and/or range or some other modification of one or more of the decoders motion vectors.

Another method for limiting said decoder function comprises of reducing the number of coefficients inverse quantized and inverse DCT transformed by selectively setting coefficients to alternate values which are easy to inverse quantize and inverse DCT, such as zero. The decision to limit these decoder functions may be based on information regarding said bitstream and/or said decoder.

Another method for limiting said decoder function comprises of eliminating some or all of the processing required during color component decoding.

Another method for limiting said decoder function comprises of limiting the processing applied to the decoded video pictures.

DESCRIPTION OF THE PREFERRED EMBODIMENTS

Figure 1:
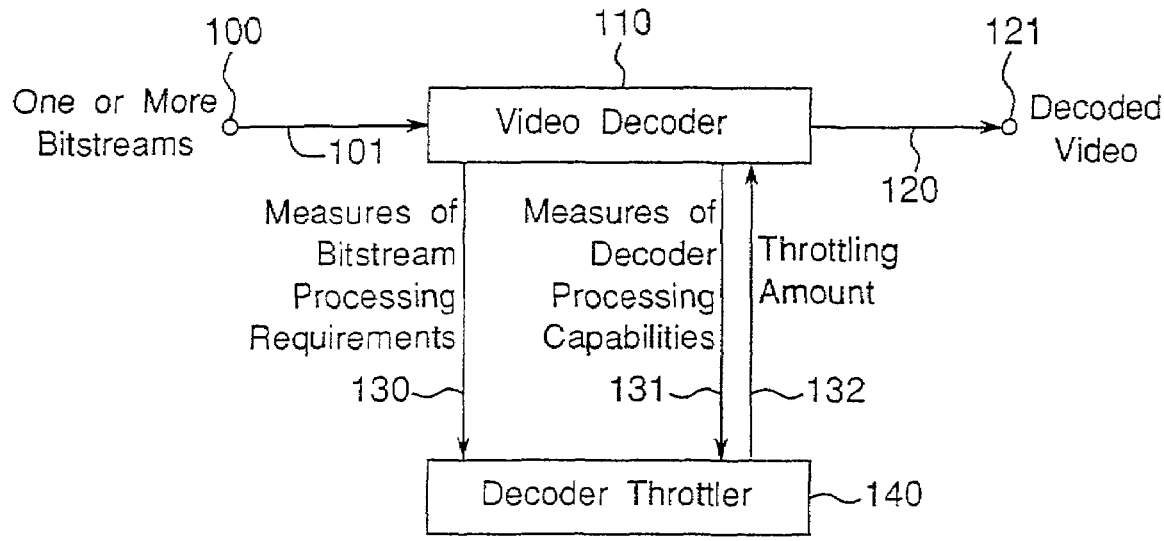
FIG. 1 is a block diagram of a first embodiment of the Invention.

A first embodiment of the invention is shown in FIG. 1. One or more bitstreams are input via the bitstream input 100, 101. The video decoder 110 decodes the bitstream and outputs decoded video 120, 121. Measures of the bitstreams' processing requirements 130 and decoder's processing capabilities 131 are passed from the video decoder 110 to the decoder throttler 140. Throttling amount 132 is passed from the decoder throttler 140 to the video decoder 110.

The operation of the embodiment in FIG. 1 is now described. The video decoder 110 extracts measures of the bitstream processing requirements from the input bitstreams 101 and passes these measures 130 to the decoder throttler 140. The video decoder 110 also determines it's capabilities for decoding the bitstream and passes this measure 131 to the decoder throttler 140. The decoder throttler 140 uses these measures 130, 131 to decide how the video decoder 110 function can be throttled and passes this throttling amount 132 information to the video decoder 110.

It is possible that no measures of the bitstreams 130 are taken and passed to the decoder throttler 140. In this case, the decoder throttler 140 determines how to throttle the video decoder 110 by using the measure of the decoder's processing capabilities 131, or some other measure. It is also possible that no measures of the decoder's processing capabilities 131 are taken and passed to the decoder throttler 140. In this case, the decoder throttler 140 determines how to throttle the video decoder 110 by using the measures of the bitstream processing requirements 130, or some other measure.

It is possible that no measures of the bitstreams 130 or decoder's processing capabilities are taken and passed to the decoder throttler 140. In this case, the decoder throttler 140 determines how to throttle the video decoder 110 by using some other measure, or by using some predetermined method. For example, it is possible that due to some information known about the decoder 110 and decoder throttler 140 when their architectures are designed, the decoder throttler 140 can always throttle in the same way. The number of measures and origin of the measures is not limited by this invention.

The effect of the embodiment described by FIG. 1 is the ability of the video decoder to throttle it's performance requirements.

Figure 2:
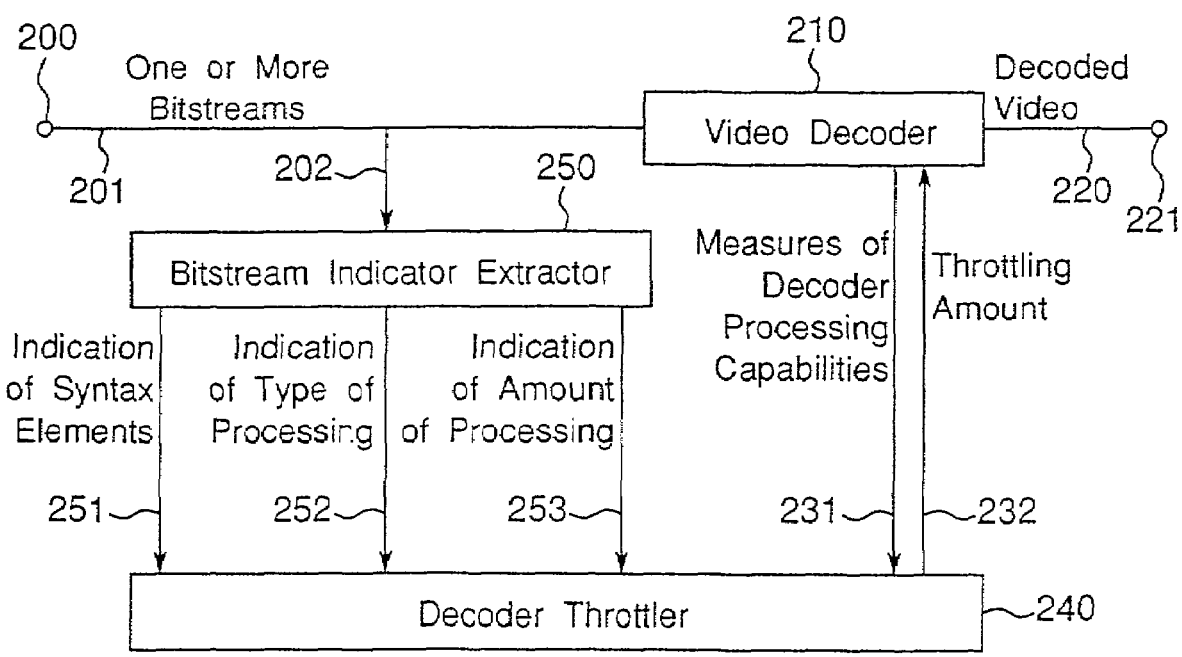
FIG. 2 is a block diagram of a second embodiment of the Invention.

A second embodiment of the invention is shown in FIG. 2. One or more bitstreams are input via the bitstream input 200, 201. The video decoder 210 decodes the bitstream and outputs decoded video 220, 221. The input bitstreams 202 are passed to the bitstream indicator extractor 250 where measurements are made concerning the bitstream. Indications such as syntax elements 251, type of processing required for decoding 252, and the amount of processing required 253, are passed to the decoder throttler 240. The decoder's processing capabilities 231 are passed from the video decoder 210 to the decoder throttler 240. Throttling amount 232 is passed from the decoder throttler 240 to the video decoder 210.

The operation of the embodiment of FIG. 2 is now described. The bitstream indicator extractor 250 extracts measures of the bitstream processing requirements from the input bitstreams 202. It determines indicators which characterise the stream's contents and types and amounts of processing required to decode the bitstreams and passes these indicators 251, 252, 253 respectively to the decoder throttler 240. The video decoder 210 also determines it's capabilities for decoding the bitstream and passes this measure 231 to the decoder throttler 240. The decoder throttler 240 uses these indicators 230, 231 to decide how the video decoder 210 function can be throttled and passes this throttling amount 232 information to the video decoder 210.

It is possible that some or all of the indications 251, 252, 253 taken by the bitstream indicator extractor 250 are not used by the decoder throttler 240. In this case, the decoder throttler 240 determines how to throttle the video decoder 210 by using the measure of the decoder's processing capabilities 231, or some other measure. It is also possible that no measures of the decoder's processing capabilities 231 are taken and passed to the decoder throttler 240. In this case, the decoder throttler 240 determines how to throttle the video decoder 210 by using the indications 251, 252, 253 determined by the bitstream indicator extractor 250, or some other measure. It is possible that no bitstream indications 251, 252, 253 or decoder's processing capabilities 231 are taken and passed to the decoder throttler 240. In this case, the decoder throttler 240 determines how to throttle the video decoder 210 by using some other information, or by using some predetermined method. For example, it is possible that due to some information known about the decoder 210 and decoder throttler 240 when their architectures are designed, the decoder throttler 240 can always throttle in the same way. The number of indicators and measures and the origin of the indicators and measures are not limited by this invention.

Figure 3:
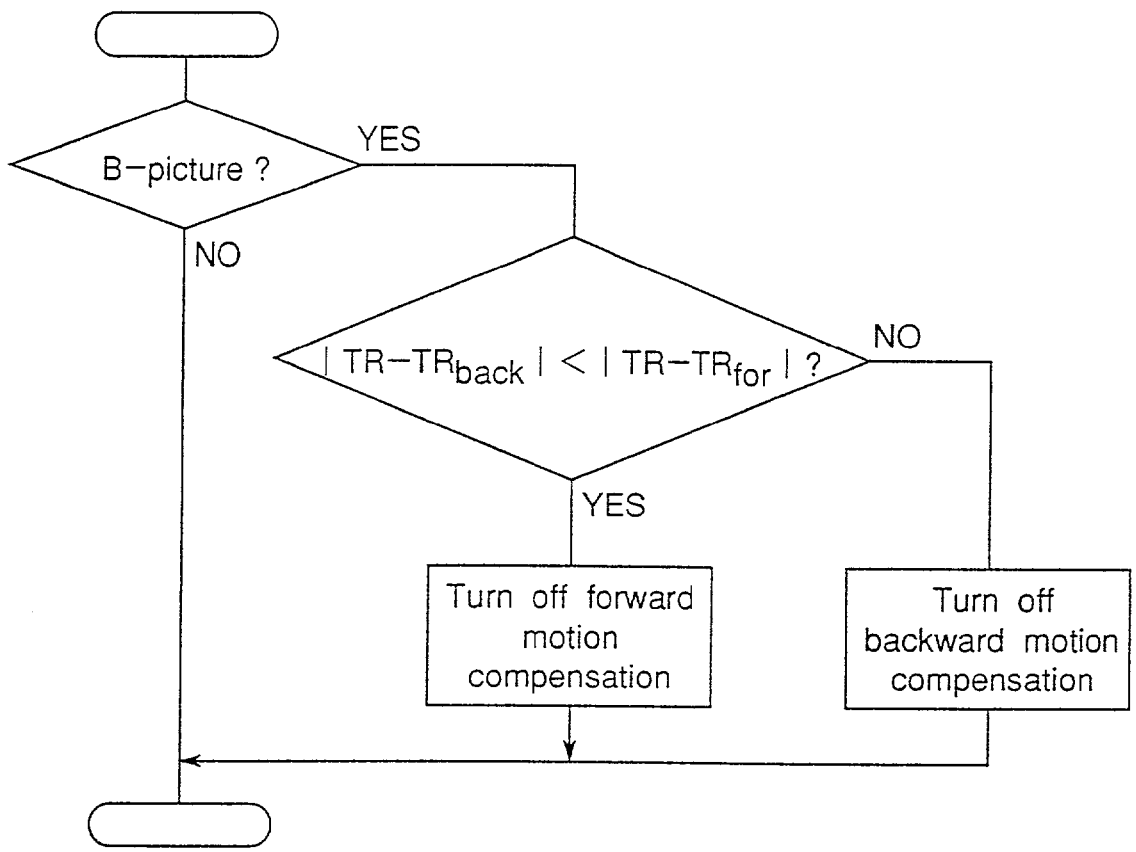
FIG. 3 is a flow chart using motion vector throttling.

FIG. 2 and FIG. 3 can be used to describe another embodiment of this invention. In this embodiment, an MPEG2 video decoder is used. The following are extracted by the bitstream indicator extractor 250:
picture_coding_type (I, P, B, D)
temporal_reference FIG. 3 describes a flow chart used to determine which motion vectors (forward or backward) in a B-picture are to be discarded. The temporal_reference information is used to determine whether the forward or backward reference is of further temporal distance from the picture being decoded. The reference of furthest distance is not used, effectively turning off motion vectors referring to it. In other words, the B-picture only uses uni-directional prediction in this embodiment.

In FIG. 3, $|TR-TR_{for}|$ is the absolute value of the difference in time of the picture being decoded and the picture used as the motion compensated forward reference, and $|TR-TR_{back}|$ is the absolute value of the difference in time of the picture being decoded and the picture used as the motion compensated backward reference.

The picture_coding_type and temporal_reference are not the only bitstream characteristics which can be extracted and used for throttling the video decoder 210. This invention does not limit the type or number of indicators used for determining the way to throttle the video decoder 210. The invention does not limit the characteristics to specific syntax elements. For example, the characteristics could be indicators that are not specific syntactic elements, like indicators of the number of macroblocks of a particular type.

The indicators may have been inserted into the bitstream by the encoder, or may be implied by some bitstream elements. The indicators may be at a higher syntactic level, for example, the system bitstream level. The indicators taken from the bitstream for a particular element may not be used to control the decoding of that particular element. For example, the indicators associated with one picture may be used to control the decoding of another picture. For example, the indicators of a preceding picture could be used to control the decoding of the current picture.

The invention is also not limited to the frequency of video decoder 210 throttling as described by the embodiment described in FIG. 3. For example, the decision of whether to use bi-directional prediction may be made on a pixel region by region case. For example, the decision could be re-evaluated every macroblock.

Also, the previous embodiment did not describe the use of measures of the decoder processing capability 231. These can be used to detect when a decoder is very busy, at which time it cannot achieve real time decoding of the bitstreams, and so decoder throttling is needed. Likewise, the measures of decoder processing capability 231 can indicate when the decoder is not busy, and can achieve real time, video decoding with no throttling of it's functions. In other words, the method of making the decision of whether or not to turn off some motion vectors and their associated reference compensation processing, is not limited by this invention.

The effect of this embodiment is the significant reduction of frame memory accessing and processing for B-pictures. Reference frame memory reading is effectively cut in half due to the absence of the bi-directional processing of motion compensated references. Although the quality of the resulting decoded video is degraded, this is considered an acceptable side-effect of the invention, since the invention is used to reduce decoder cost by degrading the picture quality. Since B-pictures are not used for further predictions, the errors in the pictures introduced by the throttling do not propagate to other pictures.

Figure 4:
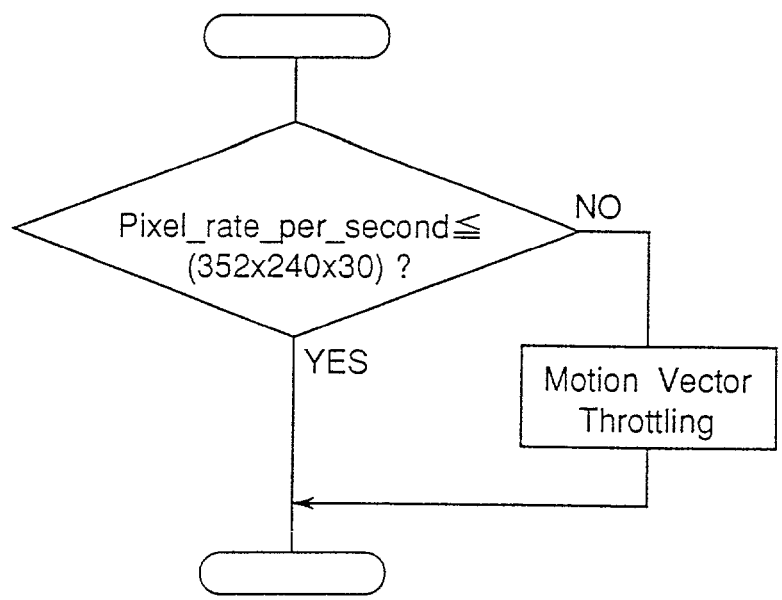
FIG. 4 is a flow chart using picture size and rate.

FIG. 4 shows a further embodiment in which the picture size and rate is used as an indication of the amount of processing 253 which is required by a bitstream. In this embodiment, the following additional elements are determined from a bitstream:
horizontal_size
vertical_size
frame_rate_value These are then used to decide if the decoder will employ some throttling techniques or not, based on the bitstreams required decoder output pixel rate In the example shown, it is used, but is not limited to, enable the motion vector throttling described by FIG. 3.

Another embodiment of the invented method modifies the motion vectors in a way that reduces the computational and/or memory bandwidth requirements of the decoder. One embodiment utilises the precision of motion vectors.

Figure 5:
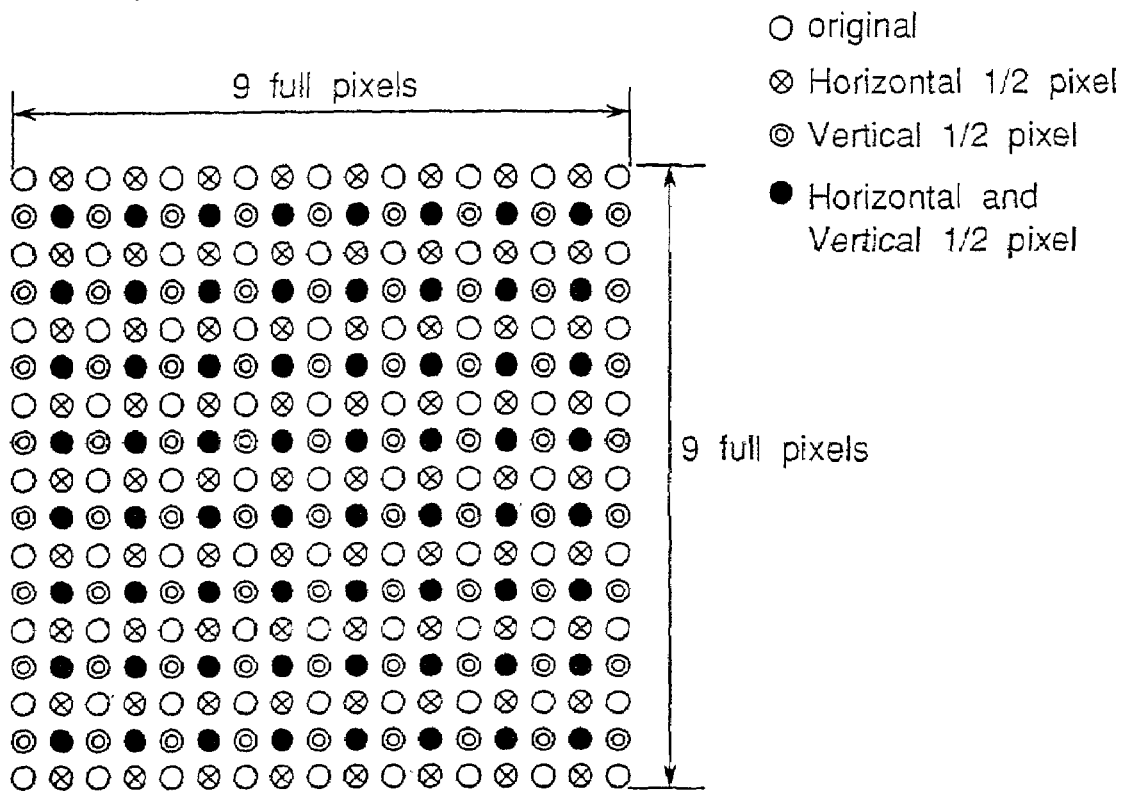
FIG. 5 is a diagram showing ½ pixel motion compensation.

FIG. 5 describes how ½ pixel motion compensated references are determined by using the neighbouring full pixel values. If a spatial region required ½ pixel interpolations, more reference frame memory pixel data is needed. For example, if an 8×8 pixel region is desired using full pixel motion vectors, an 8×8 region would be required to be read. On the other hand, if both horizontal and vertical ½ pixel motion compensation was required, a 9×9 region must be read. After ½ pixel interpolations of nearest neighbour full pixel values, the desired 8×8 region would be determined. Thus, it is possible to reduce a video decoder's processing requirements by limiting the precision of it's motion vectors to full pixel precision.

The invention does not limit the reducing of the precision of the motion vectors from ½ pixel to full pixel values. In fact, many video decoders do not access the reference frame memories pixel by pixel, but instead group the pixels into accessible words. Thus, limiting motion vector precision to the word size of the reference frame memories can be performed.

The effect of this embodiment is the reduction of frame memory accessing and processing for pictures using motion compensated prediction. Although the quality of the resulting decoded video is degraded, this is considered an acceptable side-effect of the invention, since the invention is used to reduce decoder cost by degrading the picture quality.

Another embodiment of the invented method reduces the motion vector range. For example, if the range of motion vectors is +/−64 pixels, the range can be limited to +/−16 in the decoder. The limited range is not specific to this embodiment. For example, it could be limited to 0 pixels. The effect of this embodiment is that the frame memory accessing is restricted to a smaller region of the picture. This can be particularly useful in motion compensation architectures which use memory cache. The more pixels which are accessed from cache, the fewer cache hits. Cache hits mean that the desired pixel is not in the cache memory, so they must be fetched from a typically bigger and slower memory which holds the desired pixels. The overall effect of a cache hit is a reduced processing performance. The effect of reducing the motion vector range is to reduce the number of cache hits, and thus improve processing performance.

Figure 6:
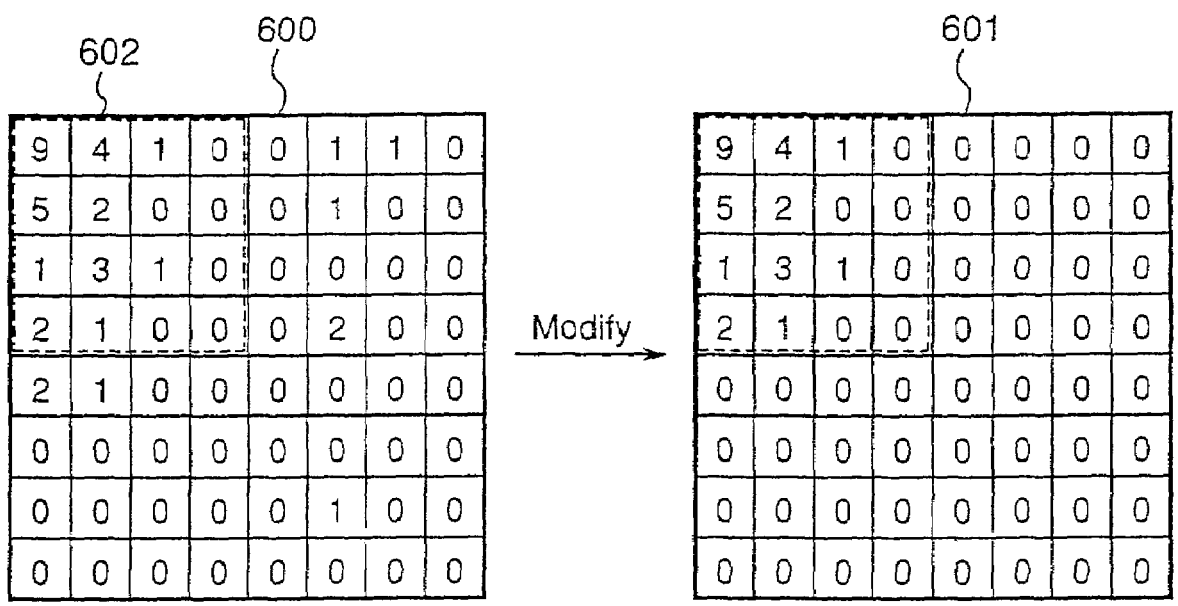
FIG. 6 is a diagram showing modifying coefficient values

Another embodiment of the invented method modifies the values of some of the coefficients decoded from the bitstream in order to make the downstream processing of these coefficients less computationally intensive. An example of such a modification is shown in FIG. 6. The original coefficients from the bitstream 600 are modified to result in the modified values 601. In this example, all values outside of the grey area 602 are set to zero. The effect of this in a DCT based system such as MPEG2 for example, where a video decoder typically performs inverse quantization before inverse DCT, is that by setting the coefficient values decoded from the bitstream to values easily inverse quantized, the processing requirements for inverse quantization can be reduced. For example, if some of the coefficients are set to zero, the result after inverse quantization of these coefficients can be set to zero without the usual calculations as defined by the MPEG2 standard.

In addition, some implementations of an inverse DCT utilize detected coefficients that are zero to reduce the computational requirements of the inverse DCT. For example, in a separable inverse DCT in which a subset of the coefficients are to be transformed, if the subset is all zero, the results will also be all zero. In this case the inverse transform can be completed much easier simply by setting the results to zero rather than by calculating the inverse transform. This invention is not limited to setting coefficient values from the bitstream to zero. They can be modified to any value which results in less downstream processing.

It is also does not limit which values are modified. For example, it is possible to limit the number of non-zero coefficients in a block simply by stopping the saving of the values from the bitstream once the limit for the block is reached.

This invention is not limited to decoders using the inverse DCT as it's transform. Other transform's coefficients can also be modified to reduce their computational requirements.

Another embodiment of this invention is the reduction or elimination of the processing of one or both of the color components. For example, the coefficient values can be discarded and the pixel values for the color components set to neutral. In this case, there is no further processing of the color components required by the decoder. For example, inverse quantization, inverse DCT and motion compensation are not required for the color components. The effect of this embodiment is the significant reduction of decoder processing requirements. Another effect is the loss of color in the displayed picture, but this may be an acceptable degradation due to the reduced decoder computations.

Another embodiment of this invention is the reduction of processing performed on the decoded video pictures. For example, post filters can be used by a video decoder to remove some blocky noise introduced by the encoding and decoding processes. The effect of reducing this filtering is the reduction of the computational requirements of the post filter. The reduction of the processing can be the reduction of the number of taps used by the post filter. Other forms of post processing can also be reduced, such as format conversion filters.

There are many combinations of the invented methods which can be used to reduce the processing power requirements of a video decoder. This invention does not limit the combinations. For example, motion vectors can be modified, the coefficients extracted from the bitstream can by modified, and the processing performed on the decoded pictures limited within the same decoder. The overall effect of this invention is the great freedom of control over the processing requirements and output picture quality of a video decoder. This control is useful when decoding single bitstreams or multiple bitstreams that may have associated priorities.

One effect of this invention is that the processing power of video decoders can be reduced, permitting bitstreams with high computational requirements to be decoded by decoders with lower computational ability. By basing the decision of the type and amount of decoder function limiting on measures of the processing power required to decode bitstreams, measures of said decoder's processing capabilities, or some combination of these measures, an appropriate choice of limiting can be made which balances the trade-off between computational requirements and picture quality.

An effect of using indications of the syntax elements in a bitstream and types and amounts of processing in said bitstream is that the type and amount of decoder function limiting can be made considering the content of the bitstream, thus permitting a more suitable and visually appealing choice for function limiting.

An effect of using measures of the decoder's processing capabilities is that it permits the selection of functions to limit to be based on the decoder's abilities, which is dependant on the decoder's architecture.

An effect of reducing the computational power of one or more functions in a decoder is the reduction of the decoder's computational power.

An effect of turning off the use of one or more of the motion vectors normally used to retrieve a motion compensated reference is a reduction in processing requirements and reference frame memory access bandwidth.

An effect of selectively turning off the use of one or more motion vectors is that it is possible to select those motion vectors to turn off which have a less detrimental affect on picture quality than others, thus permitting a trade-off between picture quality and computational requirements.

An effect of limiting some of the motion vectors which are of temporally longest distance is that the visual quality is typically less affected by turning off some of these than it is for motion vectors of shorter temporal distance.

An effect of limiting the motion vectors which are least highly correlated with those motion vectors in surrounding regions of the picture region being decoded is that the perceptibility of degrading the picture quality of the regions with these motion vectors may be less than that of degrading more highly correlated motion regions. It also has the effect of permitting cache based architectures for motion compensation functions to have fewer cache hits if the less highly correlated motion vectors are not used.

An effect of selecting the motion vectors which are of spatially longest distance is that it may permit cache based architectures to have fewer cache hits if the motion references are more close together, since presumably the reference data would not be going outside of the cache so often.

An effect of modifying the motion vectors or limiting the precision and/or range of one or more of the decoder's motion vectors is that the number of memory accesses can be reduced when accessing motion compensated references.

An effect of reducing the number of coefficients inverse quantized and inverse DCT transformed by selectively setting coefficients to alternate values, such as zero, is that the computational requirements of inverse quantization and inverse DCT can be reduced.

An effect of reducing the processing of the color components is the overall reduction of decoder processing.

What is claimed is:

1. A method of controlling processing requirements of a video decoder that receives and decodes incoming video data, the method comprising:
    determining a throttling amount, using a measure of computational processing power required to decode at least one bitstream of the video data and a measure of the decoder's processing capabilities, without requiring encoded throttling control data associated with the video data; and
    reducing computational processing of the video data by the decoder, based on the throttling amount, comprising reducing an amount of processing performed on the decoded video data prior to displaying a picture comprising the decoded video data.

2. The method according to claim 1, wherein reducing the amount of processing comprises limiting a function of at least one post filter.

3. The method according to claim 1, wherein reducing the amount of processing comprises limiting a function of at least one format conversion filter.

4. The method according to claim 1, wherein the measure of the computational processing power required to decode the at least one bitstream comprises at least one of:
    an indication of syntax elements in the bitstream;
    an indication of a type of processing required for the bitstream;
    an indication of an amount of processing required for the bitstream; and
    a combination of the type and the amount of processing required for the bitstream.

5. A system for dynamically processing incoming video data comprising:
    a video decoder that receives and decodes the video data; and
    a decoder throttler that receives from the decoder a measure of computational processing power required to decode the video data and a measure of a processing capability of the decoder, and without receiving encoded throttling control data, determines a throttling amount based on the measure of the computational processing power and the measure of the processing capability of the decoder;
    wherein the decoder throttler provides the throttling amount to the decoder, which reduces an amount of processing performed on the decoded video data prior to displaying a picture comprising the decoded video data, in accordance with the throttling amount.

6. The system according to claim 5, further comprising at least one post filter, the decoder reducing the amount of processing by limiting functions of the at least one post filter.

7. The system according to claim 5, further comprising at least one format conversion filter, the decoder reducing the amount of processing by limiting functions of the at least one format conversion filter.

8. The system according to claim 5, further comprising a bitstream indicator extractor that measures the computational processing power required to decode at least one bitstream of the video data by at least one of:
    measuring an indication of syntax elements in the bitstream;
    measuring an indication of a type of processing required for the bitstream;
    measuring an indication of an amount of processing required for the bitstream; and
    measuring a combination of the type and the amount of processing required for the bitstream.

9. A method of controlling processing requirements of a video decoder that receives and decodes incoming video data, the method comprising:
    determining a throttling amount, using a measure of computational processing power required to decode at least one bitstream of the video data and a measure of the decoder's processing capabilities, without requiring encoded throttling control data associated with the video data; and
    reducing computational processing of the video data by the decoder, based on the throttling amount, comprising reducing a number of coefficients inverse quantized and inverse DCT transformed by selectively setting coefficients to alternate values.

10. The method according to claim 9, wherein the alternate values comprise zero.

11. The method according to claim 9, wherein the measure of the computational processing power required to decode the at least one bitstream comprises at least one of:
    an indication of syntax elements in the bitstream;
    an indication of a type of processing required for the bitstream;
    an indication of an amount of processing required for the bitstream; and
    a combination of the type and the amount of processing required for the bitstream.

12. A system for dynamically processing incoming video data comprising:
    a video decoder that receives and decodes the video data; and
    a decoder throttler that receives from the decoder a measure of computational processing power required to decode the video data and a measure of a processing capability of the decoder, and without receiving encoded throttling control data, determines a throttling amount based on the measure of the computational processing power and the measure of the processing capability of the decoder;

wherein the decoder throttler provides the throttling amount to the decoder, which reduces a number of coefficients inverse quantized and inverse DCT transformed by selectively setting coefficients to alternate values, in accordance with the throttling amount.

13. The system according to claim 12, further comprising a bitstream indicator extractor that measures the computational processing power required to decode at least one bitstream of the video data by at least one of:

measuring an indication of syntax elements in the bitstream;

measuring an indication of a type of processing required for the bitstream;

measuring an indication of an amount of processing required for the bitstream; and measuring a combination of the type and the amount of processing required for the bitstream.

14. A method of reducing processing power requirements of a video decoder that receives and decodes incoming video data, the method comprising:

determining a throttling amount based on at least one of a measure of computational processing power required to decode at least one bitstream of the video data and a measure of the decoder's processing capabilities; and controlling computational processing requirements of the decoder, based on the throttling amount, the controlling the computational processing requirements comprising:

comparing two temporal references corresponding to two motion vectors of a picture of the video data being decoded;

determining which one of the two motion vectors has a closer temporal distance from the picture being decoded, based on the temporal references; and processing only the one of the two motion vectors having the closer temporal distance.

15. The method according to claim 14, in which the two temporal references comprise forward references.

16. The method according to claim 14, in which the two temporal references comprise a forward reference and a backward reference.

17. The method according to claim 14, wherein the measure of the computational processing power required to decode the at least one bitstream comprises at least one of:

an indication of syntax elements in the bitstream;

an indication of a type of processing required for the bitstream;

an indication of an amount of processing required for the bitstream; and a combination of the type and the amount of processing required for the bitstream.

18. A system for dynamically processing an incoming video data comprising:

a video decoder that receives and decodes the video data;

a decoder throttler that determines a throttling amount based on at least one of a measure of computational processing power required to decode the video data and a measure of a processing capability of the decoder; and a bitstream indicator extractor that extracts two temporal references associated with two motion vectors of each picture to be decoded by the video decoder;

wherein the decoder throttler provides the throttling amount to the decoder, which processes, for each picture, only one of the two motion vectors having a closer temporal distance from the picture being decoded, based on a comparison of the two temporal references associated with the two motion vectors.

19. The system for dynamically processing an incoming video data according to claim 18, wherein each picture from which the two temporal references are extracted comprises a B-picture.

20. The system according to claim 18, the bitstream indicator extractor further measures the computational processing power required to decode at least one bitstream of the video data by at least one of:

measuring an indication of syntax elements in the bitstream;

measuring an indication of a type of processing required for the bitstream;

measuring an indication of an amount of processing required for the bitstream; and measuring a combination of the type and the amount of processing required for the bitstream.

* * * * *